April 23, 1968 E. E. GILBERT 3,379,835

DATA CODER AND INPUT DEVICE

Filed March 30, 1966 4 Sheets-Sheet 1

Ernest E. Gilbert,
INVENTOR.
BY.

GOLOVE & KLEINBERG,
ATTORNEYS.

April 23, 1968 E. E. GILBERT 3,379,835

DATA CODER AND INPUT DEVICE

Filed March 30, 1966 4 Sheets-Sheet 2

Ernest E. Gilbert,
INVENTOR.
BY.

GOLOVE & KLEINBERG,
ATTORNEYS.

Ernest E. Gilbert,
INVENTOR.
BY.

GOLOVE & KLEINBERG,
ATTORNEYS.

DATA CODER AND INPUT DEVICE

Filed March 30, 1966 4 Sheets-Sheet 4

Ernest E. Gilbert,
INVENTOR.
BY.

GOLOVE & KLEINBERG,
ATTORNEYS.

United States Patent Office 3,379,835

Patented Apr. 23, 1968

3,379,835
DATA CODER AND INPUT DEVICE

Ernest E. Gilbert, Garden Grove, Calif., assignor to Bolt Beranek and Newman Inc., Cambridge, Mass.

Filed Mar. 30, 1966, Ser. No. 538,843
4 Claims. (Cl. 178—18)

ABSTRACT OF THE DISCLOSURE

The disclosed data encoding apparatus encodes the position of a cursor with respect to two coordinates of a table. The cursor is supported upon a track for movement along one coordinate, and the track is supported for movement along the other coordinate. The movement of the cursor is transmitted to sets of brushes which cooperate with code cards, one set of brushes being coupled to the cursor by cables, other cables being employed to stabilize the movement of the track. A drum coupled to one of the last-mentioned cables takes up slack in an electrical lead wire trailing from the cursor and connected to a push botton thereon for producing an output.

The present invention relates to data input devices and more particularly, apparatus for generating a coded representation of a selected element of a matrix.

The problem of information storage and retrieval has always been compounded by the requirement that information be stored in some kind of reasonable fashion so that the information can be retrieved when required with a minimum of difficulty. For example, a large commercial organization may have several form letters which are to be used under certain prescribed circumstances and each form may be designated by a suitable number. In order to retrieve any particular form letter for utilization, it is also necessary to maintain a cross-index in which the circumstances surrounding the use of each such letter are set forth, together with the code number of the particular letter.

In use, therefore, a fact situation must be analyzed and compared with the index of fact situations and when a match is found, the code number of the form letter will be available so that the letter itself can be retrieved and utilized.

In still other situations, such as in the telegraph industry, many form messages are available for all occasions, which messages may be utilized by the public at reduced rates and which may be transmitted by the telegraph company, not in their complete form, but rather by means of some coded designation which represents the particular message. In order to utilize such a system, a list of the messages must be made available, together with a code designation corresponding to each.

In yet another field of activity, computer programs and/or routines and sub-routines may be stored in various locations of a computer memory and may be called into use by merely addressing the memory location in which they are stored. These might include, for example, arithmetical operations such as division routines, square root routines, precentage computations, tax calculations, and other operations. Generally, this form of information storage and retrieval depends upon a tabular index in which the desired stored information can be identified and the code combination corresponding to its location is provided so that the information can be retrieved. Typical of this form of index is the so-called "juke box," commonly found in places of amusement wherein up to one hundred musical selections may be individually addressed. Switches, in two banks of ten switches each, are provided for the example of the one hundred possible selections.

The musical titles are listed and a code combination identifies each, for example, by a combination of alphabetic and numerical characters, each corresponding to a switch. A selection which is coded as "A3" can be "retrieved" by energizing the switch marked "A" in the alphabetic bank and the switch marked "3" in the numerical bank.

It will be apparent to those familiar with the art that this scheme is the equivalent of a two-dimensional matrix where the alphabetical characters represent a first coordinate set and the numerical characters represent a second coordinate set and that each cross point represents a storage location.

To carry the process one step further, if a third, mutually orthogonal coordinate is provided, then the addition of ten switches corresponding to the third coordinate would increase the store to one thousand cross points or information locations. If, now, a plurality of two-dimensional matrices were set up, each bearing a different identification number, it is clear that the identification number of the particular matrix, if added to the coordinate location of a desired cross point, will uniquely identify that cross point for purposes of information storage and retrieval.

Coordinate locations have long been utilized to identify cross points in a matrix and, of course, the most common utilization of such a scheme is in maps and/or graphs. In these cases, the coordinates are used to locate information at the intersection of the coordinates. If, one the other hand, the situation were reversed, the information location could be used to generate a code signal which corresponds to that location.

A matrix of push buttons, for example, could be provided, each imprinted with the desired information. Energizing the appropriate push button then generates the appropriate code. Such as scheme is obviously prohibitively expensive and unnecessarily complicated.

Another approach has been described in a co-pending application of Fletcher, Gibbons, Keast and Morefield, entitled "Graphical Data Input Device," filed Nov. 23, 1964, Ser. No. 420,238, and assigned to the assignee of the present invention. That application describes a device in which any point on a two-dimensional chart could signal the polar coordinates $\rho,\theta$ of such point using an extensible are mounted on a pivot. The rotation of the arm about the pivot drives a rotary potentiometer and the linear movement of the arm drives a linear potentiometer. Appropriate analog-to-digital conversion circuits are provided so that each pointer position can be signaled in terms of the $\rho,\theta$ coordinates of that location, with respect to a predetermined location.

Similarly, it is possible to modify conventional X–Y platters by replacing the X and Y drive mechanisms by suitable potentiometers and/or shaft encoders so that manual operation of the pen carriage generates, at each location, a pair of signals which, through appropriate circuitry, are converted into a code.

It would seem that such a modified X–Y plotter would be desirable for the generation of signals representing a coordinate location in a two-dimensional matrix. The complexity and costs of either digital shaft encoders, or potentiometers combined with analog-to-digital conversion circuits, however, are such as to prohibit the use of a modified plotter for those operations that inherently require a relatively simple and inexpensive input device.

Other approaches have been considered for the purpose of converting a coordinate location to a code combination corresponding to that location. Wholly, analog devices, such as voltage gradient plates which transmit analog voltages corresponding to the coordinate locations, are not directly usable with most digital circuits, in the absence of analog-to-digital conversion circuits.

A vexing problem in the utilization of such devices resides in the appropriate placement of suitable switching mechanisms so that the device does not provide continuous incorrect signals while being indexed to the desired location. If such a switch is included as a part of the location-determining mechanism, which is physically positioned over the desired location, then the problem of a trailing electrical cord is created. If the switch is located elsewhere, then either two-handed operation is required or the location must be released while the switch is energized, increasing the possibility of error due to inadvertent motion of the locator when released.

An object of the present invention, accordingly, is to provide a new and improved data coder device that shall not be subject to the above-described limitations and difficulties, but that, to the contrary, is relatively inexpensive and simple to operate by relatively untrained personnel and that can be utilized with a plurality of different "matrix-index" sheets, providing a unique digital-code combination corresponding to the location of each information item of the matrix. In accordance with the invention, a simple switch mechanism is provided that permits the generation of the code combination corresponding to the location without requiring two-handed operation, and the data coder device is adapted directly to work in conjunction with conventional, readily available data transmitting devices such as teletypewriters, flexowriters, and the like. Such a data coding device may easily be adapted for use as a remote data input terminal for a digital computer system. Clearly, such device at the location of a user would enable the provision of input information to a central data processor using simple, telegraph quality data links and without requiring close proximity of the user and the computer.

According to the present invention, there is provided such an inexpensive, manually operable code generator which is structurally similar to an X–Y plotter. A cursor is mounted in a carriage in place of the plotter pen carriage and a push button switch is provided in the cursor carriage energizing the signal output circuits. The cursor is fitted with a "window" to enable the selection of an appropriate information area, the coordinate location of which is to be encoded and transmitted.

In a preferred embodiment, pairs of rails, parallel to the coordinate axes are provided. One of the pairs of rails is mounted on trucks which ride on the other of the pairs of rails. The cursor is then mounted on a carriage which traverses the traveling rails.

A first printed circuit board, having a suitable Gray binary code embedded therein, in a linear coded pattern, is mounted adjacent the stationary rails. A plurality of brush members are mounted on the traveling carriage in contact with the encoder pattern so that each position of the traveling rails can be signaled in code by appropriate energization of the code circuits. A second printed circuit board, having a similar binary code embedded therein in a linear code pattern, is mounted at one side of the chassis, parallel to the path of travel of the cursor. A cable assembly connects a brush block to move across the code pattern through the motion of the cursor carriage on its rails.

The trucks are provided with a novel suspension system including a pair of rollers which ride on top of the rail carrying the weight of the truck. A V-groove pulley rides beneath the rail and restrains non-axial movement of the trucks.

In addition, the problem of the trailing lead between the cursor switch and the appropriate energizing circuits is solved by the provision of a novel storage reel or drum which is coupled to the traveling truck, and which controls the amount of slack lead available to the cursor carriage as a function of the cursor location.

It is accordingly an additional object of the device to provide an improved graphical data input device having a novel apparatus for regulating the available length of trailing wire from a cursor switch.

It is yet an additional object of the invention to provide a novel code generator.

It is still an additional object of the invention to provide an improved travelling carriage assembly adapted to maintain alignment of a travelling carriage on parallel rails.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

Figure 1:
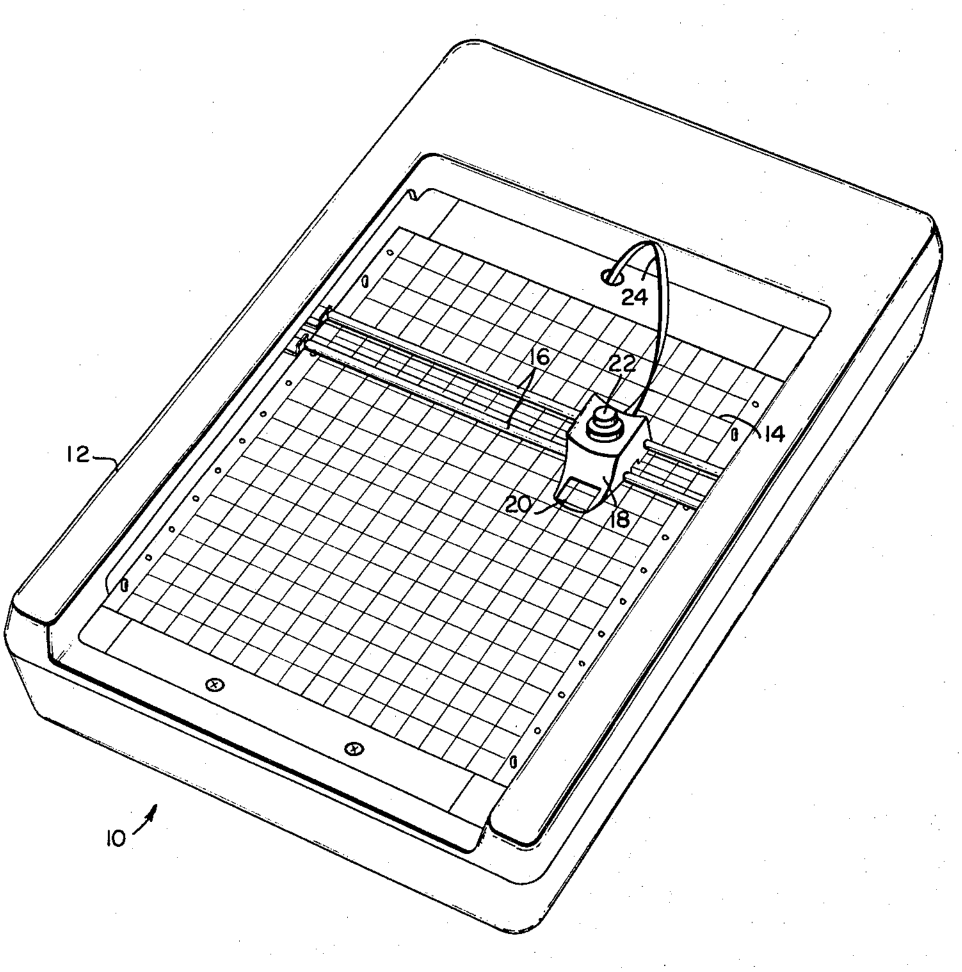
FIG. 1 is a isometric view of a data coder according to the present invention.

In FIG. 1 there is shown a preferred embodiment of the data encoder 10 according to the present invention. As will be noted by those skilled in the art, the device bears a remarkable resemblance to a conventional X–Y plotter. In FIG. 1, the device is shown enclosed in a protective case 12, which serves to conceal most of the operative details. However, there is shown a table 14, which is preferably a translucent plate that can be illuminated from below and which, in some embodiments, is adapted to receive a projected image of an information matrix.

A pair of travelling rails 16 are mounted to move in a direction orthogonal to the rails, and a cursor carriage 18 is mounted to slide laterally on the rails 16 in the axial direction. The cursor carriage 18 includes a cursor element 20 and an actuating push-button or cursor switch 22. An electrical lead 24 connects the cursor carriage to the encoder proper, and trails behind the cursor carriage 18.

Figure 2:
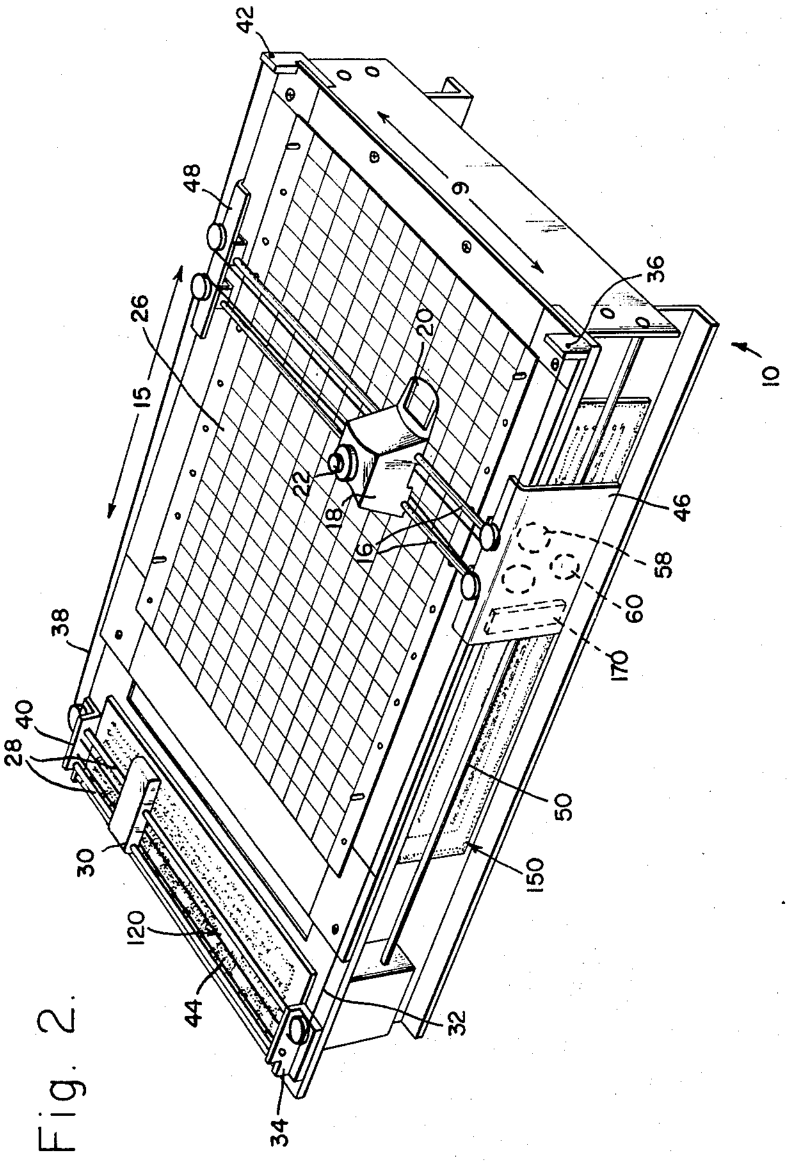
FIG. 2 is an isometric view of the coder of FIG. 1 with the protective case removed.

Turning next to FIG. 2, the encoder 10 is seen with the protective case 12 removed. As seen in FIG. 2, a code sheet 26 is placed on the table 14 and is ruled in rectangles that are the size of the exposed area of the cursor element 20. Mounted parallel to the rails 16, is a second pair of rails 28, upon which is mounted a brush block carriage 30.

A first cable 32 connects to a pair of fixed posts 34, 36, on one side of the encoder, and a second cable 38 is connected to a pair of fixed posts 40, 42 on the opposite side of the encoder. Both cables are passed around a pulley on the underside of the brush block carriage 30 and a similar pulley on the underside of the cursor carriage 18, as will be described in connection with FIG. 5.

It will be clear that as the cursor carriage 18 moves axially on the rails 16, the brush block carriage 30 will move by an equal and opposite amount on the rails 28, no matter what the position of the rails 16, relative to the surface of the coder 10.

Mounted adjacent the rails 28 and aligned therewith is an encoder plate 44, which is adapted to be contacted by brushes carried by the brush block carriage 30, as will be described in connection with FIG. 8. The particular code pattern used on the encoder 44 is, in the preferred embodiment, a reflected binary or Gray code which can represent each spatial location of the cursor carriage 18, relative to the rails 16, by a unique code combination.

A feature of the reflected binary or Gray code is that each transition from one code combination to another involves the change of only one bit, which reduces the possibility of errors due to ambiguities at a transition. Those skilled in the art can readily appreciate that a straight binary code, for example, can require several bits to change when going from say binary 7=0111 to binary 8=1000.

Although the linear encoder shown provides a unique signal indication as a function of linear position, it is possible to use yet other code patterns, such as straight binary, or other special purpose, codes which will generate the appropriate information as a function of cursor position.

The traveling rails 16 are mounted on a pair of rail trucks 46, 48, which, in turn, are mounted on a pair of slide rails 50 (one of which is shown). Third and fourth cables 54, 56 (FIG. 6) are fastened to the rail trucks 46, 48, and connect them to each other through a system of sheaves and pulleys, whereby the travelling rails 16 are maintained parallel at all times.

Figure 3:
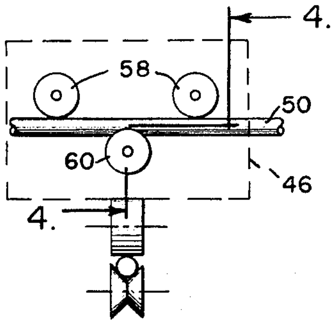
FIG. 3 is a portion only of a coder showing the mounting of a truck on one of the side rails of the apparatus of FIG. 2.

Turning next to FIG. 3, there is shown in a side, broken away view, a detail of the truck assembly 46. A pair of bogey wheels, 58, ride on top of the rail 50 in tangential relationship therewith, and a V-groove roller 60, is mounted beneath the rail and is located approximately midway between the bogey wheels 58.

Figure 4:
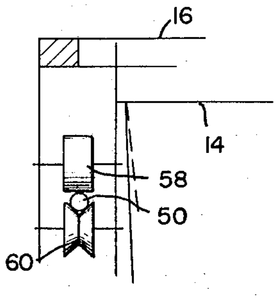
FIG. 4 is an end view of the truck of FIG. 3, taken along line 4—4 in the direction of the appended arrows.

FIG. 4 provides a better view of the cooperation of the bogey wheels 58, and the pulley 60, with the rail 50. It may be seen that this arrangement prevents skewing of the truck with respect to the axis of the rail 50. It will be apparent to those skilled in the art that alternative embodiments of the present invention could employ a plurality of pulleys 60 in place of the bogey wheels 58, and that all of the supporting rolling members could be the V-pulley type. Alternatively, the upper support members could be V-pulleys while the lower member could be a simple bogey wheel.

Figure 5:
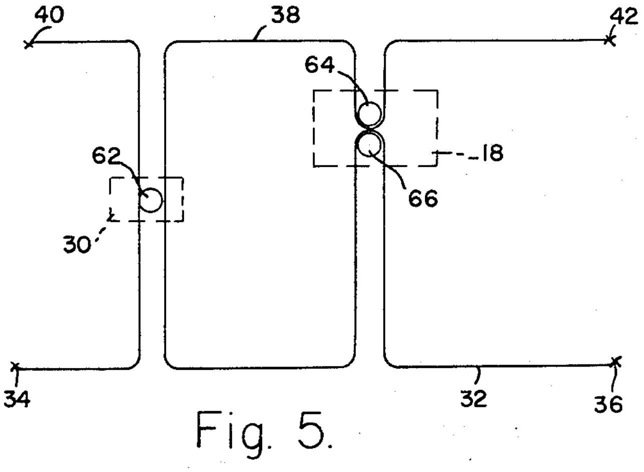
FIG. 5 is an idealized view of the manner of interconnecting the cursor carriage cables of the instant invention.

Turning next to FIG. 5, there is shown in schematic form the cabling layout for the first and second cursor cables 32, 38. As shown, the first cable 32, is anchored at posts 34 and 36, and connects the cursor 18, and the cursor brush block 30. The second cable 38 is anchored to posts 40 and 42 and also connects cursor 18 and the brush block 30. A single pulley 62 is used on the brush block 30 but a pair of pulleys 64, 66 are required for the cursor assembly.

Figure 6:
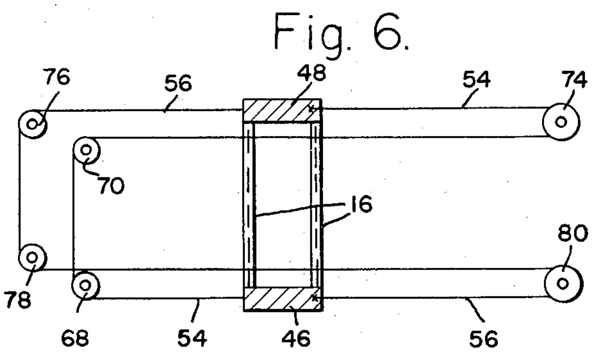
FIG. 6 is an idealized view of the travelling carriage cable interconnections.

FIG. 6 is a schematic representation, similar to that of FIG. 5, with respect to the rail truck cables 54, 56. It is to be understood that FIG. 6 is representational only, and is not intended to be an accurate showing of the exact cabling assembly of the truck carriages. As shown in FIG. 6, cable 54 is anchored to rail truck 46 and extends about a first idler 68, and crossing the underside of the table 14, passes about a second idler 70. The cable 54 is then looped around a cursor lead storage drum 72 (see FIG. 7), and continues to a third idler 74. From the third idler 74, the cable 54 continues until it is anchored to the opposite truck 48.

The second cable 56 is connected to the opposite side of truck 48 and extends around a fourth idler 76, returning under the table 14, to a fifth idler 78. The second cable 56, then runs parallel to the first cable 54, to a sixth idler 80, which is positioned opposite the third idler 74. The cable continues until it is anchored to truck 46, opposite the attachment of cable 54.

With the cable arrangement as shown, the trucks 46 and 48 will be maintained in strict parallel alignment, and the rails 16, which are supported by trucks 46, are constrained to a struct orthogonal alignment, with respect to the motion of the trucks 46, 48. It is also noted that movement of the trucks 46, 48, causes a rotation of the drum 72.

Figure 7:
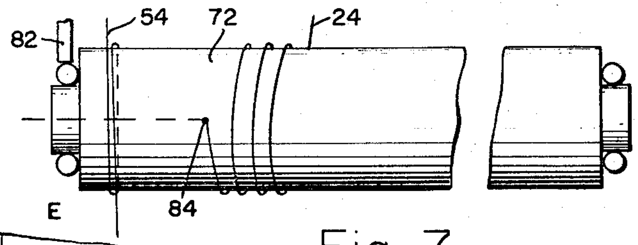
FIG. 7 is an idealized view of a storage drum for the cursor switch electrical wire.

Turning next to FIG. 7, the cursor lead windup drum 72 is shown in somewhat greater detail. As shown, the drum 72 is rotatably mounted in a suitable bearing housing 82, so that it is free to rotate about its axis. The cursor lead 24 as shown has several turns external to the drum 72, and then passes into the drum interior through an appropriate opening 84 in the drum surface. The electrical lead 24 continues through the interior of the drum until it is brought out through the axial roller connection 82, and thence to appropriate circuitry. It is noted that one of the cables, here the front cable 54, is shown with a single turn around the periphery of the drum 72. The electrical wire used for the lead 24 is preferably a highly flexible type, that permits extreme flexure without breaking.

In operation, when the cursor assembly 18 is at its farthermost position from the drum 72 ( which is mounted under the table 14) the drum may be considered as substantially "unwound," with enough lead to permit free motion of the cursor assembly on the rails 16.

As the trucks move to the opposite end of the coder, the truck motion causes the cable 54 to "wind" the drum 72, thereby wrapping the lead 24 about the drum periphery. The diameter of the drum 72 is selected so that at all times there is sufficient slack in the lead 24 to permit the cursor to traverse the rails 16 without straining the lead 24. At all times, therefore, no more than a necessary amount of lead 24 trails behind the cursor 18.

Figure 9:
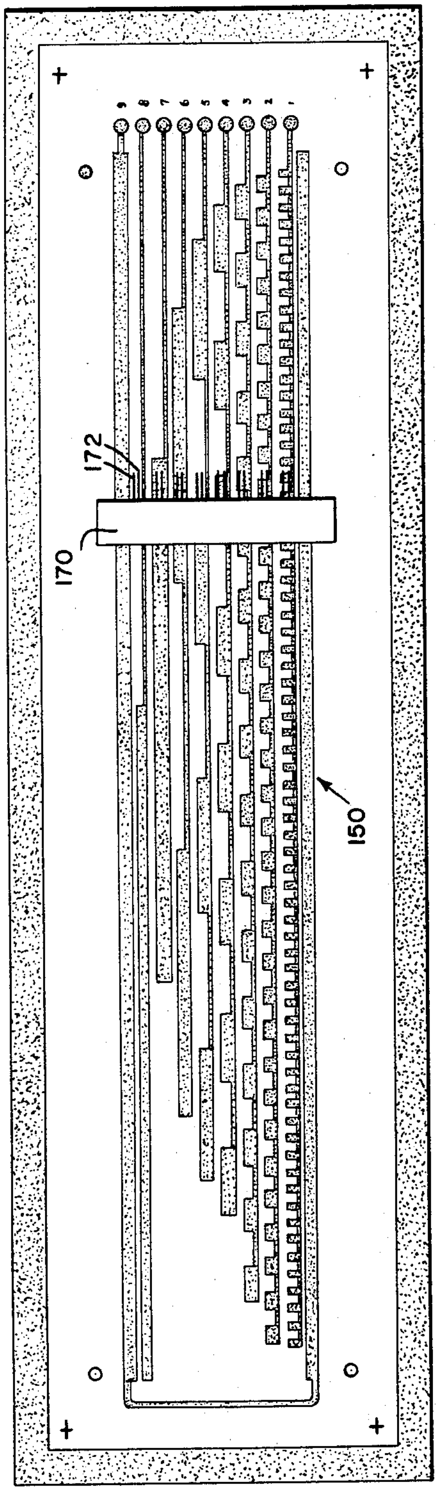
FIGS. 8 and 9 are sections of typical reflected binary code patterns usable in conjunction with the apparatus of the present invention.
Figure 8:
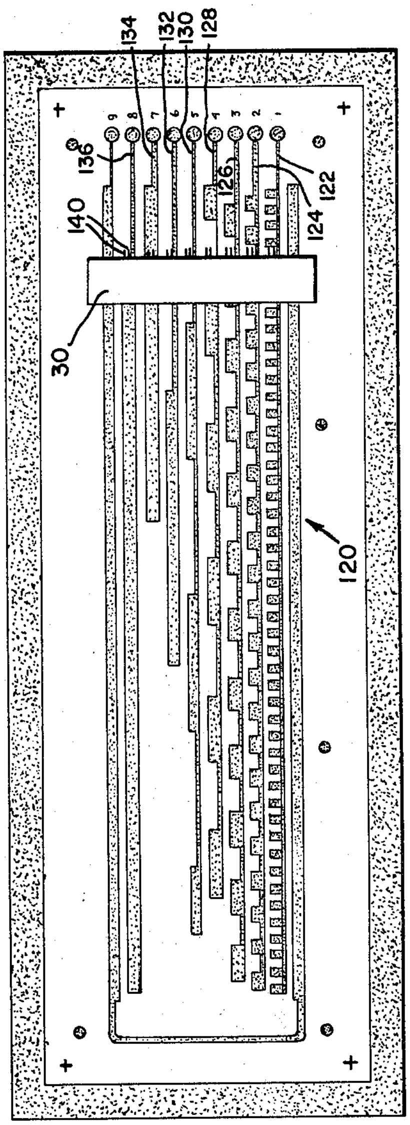

Turning to FIGS. 8 and 9, there are shown sections of the several conductive segments making up an encoder strip and, in conjunction therewith, there is shown diagrammatically, a brush block operable therewith. In FIG. 8 a portion of the encoder for the relatively short dimension is illustrated. A Gray or reflected binary code is used, which provides only a single bit change in each transition.

In the preferred embodiment, the code pattern 120 includes eight code bars, 122, 124, 126, 128, 130, 132, 134, 136. The brush block 30 includes a plurality of brushes 140 for reliability, so that at least a pair of brushes 140 are arranged to contact each of the code bars. In the present invention, the brush block is energized so that only those bars with a conductive portion in contact with a brush 140 can provide a signal to the output terminal to the conductive segment.

Similarly, in FIG. 9 the relatively long dimension code pattern 150 is shown and, similarly, a brush block 170 having a plurality of brushes 172, operates in conjunction with this code pattern. Brush block 170 is carried by truck 46 and moves along code pattern 150 fixed at one side of table 14 as shown in FIG. 2.

Cursor switch 22 may be actuated after the cursor has been moved to a chosen position of sheet 26, and the position of the cursor will be encoded by the code patterns 120 and 150 by means of circuitry (not shown) connected to lead 24 and to the code patterns. Such circuitry may include relays for reading out the code patterns serially, or the code patterns may be read out in parallel.

Figure 10:
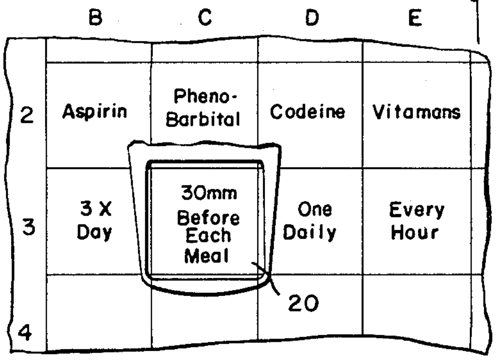
FIG. 10 is a fragmentary view of the cursor in combination with a specimen data matrix.

Turning finally to FIG. 10, there is shown a portion of a typical code matrix with a cursor window illustrating one embodiment of the present invention useful for preparing patient orders at a hospital. For example, in a first row there is a plurality of medicaments, such as "aspirin," "phenobarbital," "codeine," "vitamins," etc., respectively listed in columns B, C, D, and E. Similarly, a following row includes a selection of recommended dosages such as "Three Times Daily," "Thirty Minutes Before Each Meal," "Once Daily," "Every Hour," in columns B through E respectively.

A typical order sequence might include first, a selection of "Vitamins" at row 2, column E, and next, a dosage of "Thirty Minutes Before Each Meal," as in row 3, column C. Yet other rows could provide still other information relative to a medical order so that a computer could be called on to assemble and direct print out a message which would include all of the information stored in the memory locations coresponding to matrix coordinates 2E and 3C as in the example set out above. Obviously, the alphanumeric characters are signalled to the computer as reflected binary coded characters.

Still other applications will be obvious to those skilled in the art. For example, a plurality of form letters could be compiled, or telegraph messages could be assembled, utilizing a matrix as in the present invention.

Thus, there has been shown a novel code generating device which provides the coded representation of a matrix location, which can be uniquely corresponded to a large scale information store. A simple mechanical device is used to select each matrix intersection and a digital code corresponding to the coordinates of that location is automatically transmitted to the data processing device.

What is claimed as new is:

1. Data encoding apparatus having a table, a carriage supported for movement along one coordinate of the table and having a cursor with an electrical lead wire trailing therefrom, cable means connected to said carriage and movable therewith, and a take-up drum coupled to said cable means for rotation in response to the movement of said carriage, said lead wire being wrapped around said drum, extending through the wall of said drum into the interior thereof and along the length of said drum and out one end thereof, said drum turning in a direction to take up and release slack in said lead wire as said carriage is moved relative to said table.

2. The apparatus of claim 1, said carriage having a pair of trucks at its opposite ends supported upon rails extending along opposite sides of said table, said cable means interconnecting said trucks for maintaining a predetermined orientation of said carriage relative to said table.

3. The apparatus of claim 1, said cursor having a switch mounted thereon connected to one end of said lead wire, the other end of said lead wire being connected to means controlled by said switch.

4. The apparatus of claim 1, said cursor being supported for movement on said carriage along an orthogonal coordinate of said table, said lead wire passing through an opening in said table and having sufficient slack at all times to permit the last-mentioned movement.

References Cited

UNITED STATES PATENTS

| | | | |
|---|---|---|---|
| 1,464,631 | 8/1923 | Spuehler | 191—12.2 |
| 2,322,653 | 6/1943 | Mitchell | 178—19 |
| 2,415,718 | 2/1947 | Wilson et al. | 178—19 |

THOMAS A. ROBINSON, *Primary Examiner.*

NEIL C. READ, *Examiner.*